United States Patent
Zielke

(10) Patent No.: US 8,123,264 B2
(45) Date of Patent: Feb. 28, 2012

(54) CRASH BOX DEVICE

(75) Inventor: Stefan Zielke, Sulzbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 175 days.

(21) Appl. No.: 12/294,577

(22) PCT Filed: Mar. 30, 2007

(86) PCT No.: PCT/EP2007/053102
§ 371 (c)(1),
(2), (4) Date: Aug. 6, 2009

(87) PCT Pub. No.: WO2007/115950
PCT Pub. Date: Oct. 18, 2007

(65) Prior Publication Data
US 2009/0302624 A1    Dec. 10, 2009

(30) Foreign Application Priority Data
Apr. 5, 2006    (DE) .......................... 10 2006 015 877

(51) Int. Cl.
*B60R 19/34* (2006.01)
*B60R 19/38* (2006.01)
(52) U.S. Cl. .......................... 293/155; 293/132; 293/133
(58) Field of Classification Search ............ 296/187.09–187.11; 293/132, 293/133, 155
See application file for complete search history.

(56) References Cited

U.S. PATENT DOCUMENTS

| | | | |
|---|---|---|---|
| 3,754,784 A | 8/1973 | Heinig et al. | |
| 3,795,418 A | 3/1974 | Barenyi et al. | |
| 4,976,481 A | * 12/1990 | Yoshihira | 293/133 |
| 5,181,589 A | 1/1993 | Siegner et al. | |
| 5,201,558 A | * 4/1993 | Thum | 293/133 |

(Continued)

FOREIGN PATENT DOCUMENTS
DE    2127258 A1    12/1972
(Continued)

OTHER PUBLICATIONS

Chinese Patent Office, Chinese Office Action for Chinese Application No. 2007800113652, Mar. 7, 2010.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A crash box device and an impact absorption system with a crash box device are provided for motor vehicles. The device includes, but is not limited to: a deformable element for absorbing a collision force impacting in the main direction through a corresponding re-shaping and/or damping movement, an impact limitation device fastened on one final range of the deformable element, a support element connected with the other final range of the deformable element, preferably the final range which is opposite the other final range for the reception of the deformable element and for attaching further building components and fasteners to attach the deformable element with the impact limitation device and/or the support element. The fasteners comprise at least one holding area for holding the deformable element and the at least one guiding area branching off of this, which, in case of a collision, makes possible the movement of the deformable element from the holding area along the guiding area in a additional direction which deviates from the main direction.

10 Claims, 2 Drawing Sheets

U.S. PATENT DOCUMENTS

| | | | |
|---|---|---|---|
| 5,273,330 A * | 12/1993 | Petry et al. | 293/132 |
| 6,174,009 B1 * | 1/2001 | McKeon | 293/133 |
| 6,338,510 B1 * | 1/2002 | Kanamori et al. | 293/154 |
| 6,702,345 B1 * | 3/2004 | Yoshida | 293/133 |
| 6,802,548 B2 * | 10/2004 | Shimotsu | 293/133 |
| 6,854,574 B2 * | 2/2005 | Yoshida et al. | 188/371 |
| 7,011,350 B2 * | 3/2006 | Stol et al. | 293/133 |
| 7,066,509 B2 * | 6/2006 | Kollaritsch et al. | 293/133 |
| 7,192,067 B2 | 3/2007 | Hansen | |
| 7,357,432 B2 * | 4/2008 | Roll et al. | 293/133 |
| 7,469,956 B2 * | 12/2008 | Yasuhara et al. | 296/187.09 |
| 7,766,403 B2 * | 8/2010 | Alvarsson et al. | 293/133 |
| 7,896,411 B2 * | 3/2011 | Kano et al. | 293/133 |
| 7,896,412 B2 * | 3/2011 | Wang et al. | 293/133 |
| 2009/0021031 A1 | 1/2009 | Enderich et al. | |

FOREIGN PATENT DOCUMENTS

| | | |
|---|---|---|
| DE | 3711692 A1 | 10/1988 |
| DE | 29715786 U1 | 10/1997 |
| DE | 69407528 T2 | 4/1998 |
| DE | 19910978 A1 | 9/1999 |
| DE | 29823725 U1 | 10/1999 |
| DE | 19832114 A1 | 1/2000 |
| DE | 19942059 A1 | 3/2000 |
| DE | 20013385 U | 11/2000 |
| DE | 20013385 U1 | 11/2000 |
| DE | 19942167 A1 | 3/2001 |
| DE | 102004036929 A1 | 3/2006 |
| DE | 102005043708 A1 | 3/2007 |
| EP | 0473955 | 3/1992 |
| EP | 0473955 A2 | 3/1992 |
| EP | 00647794 A1 | 4/1995 |
| WO | 2006/001775 A1 | 1/2006 |

OTHER PUBLICATIONS

German Patent Office, German Search Report for German Application No. 102006015877.6, dated Apr. 5, 2006.

International Searching Authority, International Search Report for PCT Application No. PCT/EP2007/053102, dated Mar. 30, 2007.

Russian Patent Office, Russian Office Action for Application No. 2008143359, dated Aug. 6, 2010.

British Patent Office, British Office Action for Application No. 0815934.5, dated Sep. 22, 2010.

China Patent Office, Chinese Office Action for Application No. 2007800113652, dated Dec. 13, 2010.

British Patent Office, British Office Action for Application No. 085934.5, dated Dec. 24, 2010.

British Patent Office, British Office Action for Application No. 085934.5, dated Feb. 7, 2011.

British Patent Office, British Office Action for Application No. 085934.5, dated Apr. 11, 2011.

* cited by examiner

CRASH BOX DEVICE

CROSS-REFERENCE TO RELATED APPLICATIONS

This application is a U.S. National-Stage entry under 35 U.S.C. §371 based on International Application No. PCT/EP2007/053102, filed Mar. 30, 2007, which was published under PCT Article 21(2) and which claims priority to German Application No. 102006015877.6, filed Apr. 5, 2006, which are all hereby incorporated in their entirety by reference.

TECHNICAL FIELD

The technical field relates to a crash box device and impact absorption system with a crash box device.

BACKGROUND

Crash box devices or impact absorption systems are used in nearly all motor vehicles in order to lower the collision impact in the case of accidents and thereby minimize the cost of repair and protect passengers. Crash box devices are usually connected with the cross-members attached to the bumper or bumper device or otherwise with the car frame or motor vehicle structure. In the case of a collision that impacts the outside of the bumper, the crash box device hinders substantial damage to the vehicle frame. The cross-member and vehicle frame are configured to be highly rigid, so that the energy absorption of smaller collisions does not lead to a plastic deformation in the second support or in the vehicle frame. This is achieved using the collision damping, here the crash box device, or the impact absorption system to absorb the impact energy, and the impacting forces are considerably reduced or even completely prevented. In this way, damage to the steel components of the vehicle frame can be avoided, substantially lowering the cost of possible repairs. The crash box device or the impact systems are usually configured in such a way that they absorb the impact energy through a partially plastic deformation so that only the device for damping the collision impact itself must be changed in order to get the car on the road again.

Numerous collision damping devices for motor vehicles are known. From EP 0 473 955 B1 a collision damping device is known which is specially made for motor vehicles and has a deformation damper which comprises a slide-pipe and slidable deformation pistons therein; these can slide in the direction of the middle longitudinal axis, and the slide-pipe is provided with inner-facing, malleable protrusions in the form of beadings that run parallel to the middle longitudinal axis, against the deformation pistons.

Further, from DE 198 32 114 A1, an impact absorber for a motor vehicle is known and the impact absorber comprises an outer support pipe and a movable deformation pipe within. Furthermore, a reversible impact collision absorber is provided with a movable cylindrical casing protruding over the free end of the support pipe and a reversible, moveably guided piston, and connected to the deformation pipe at least in the slide-in direction. A deformation device is provided with a reinforced protrusion configured on the support pipe and reaching in the direction of the axis. The impact absorber is characterized in that the free end of the deformation pipe is guided with a guiding section through the free end of the support pipe against the insertion direction and the casing of the guiding section is slidably guided.

An impact absorption device for motor vehicles is known from DE 199 42 167 A1, and the impact absorption device for motor vehicles comprises a damper with a first damper-component (casing) and a slidable second damper-component (piston) opposite the first. A first fastening element is connected with the first damper-component; a second fastening element is connected with the second damper-component. A locking device for the selective production and release of a connection between the damper-component and the second fastening element is provided.

Finally, an impact absorption device is known from DE 200 13 385 U1. This impact absorption device includes at least one damper, a first damping-component (deformation pipe) which comprises at least one longitudinal slot stretching in the insertion direction; in one end of this longitudinal slot there will be a cavity with a diameter larger than the width of the longitudinal slot equipped with a slidable second damper-component (locking and re-shaping element) opposite the first damper-element (deformation pipe); this also comprises a locking device for the selective production and release of a connection between the first damper-component and the second damper-component which has a slidable bar configured laterally to the insertion and a bar and re-shaping element with an unlocking pin with a diameter smaller than the width of the longitudinal slot, with a locking and re-shaping section whose diameter corresponds to that of the cavity and is clearly larger than the width of the longitudinal slot and comprises a locking device.

The above-mentioned impact absorption devices or impact absorption equipment all exhibit the disadvantage that these are all designed for collision which essentially impacts in the direction of the longitudinal motor vehicle axis. In this way, a collision which happens at an angle can not be absorbed optimally with these devices or equipment. This equipment and devices are usually designed according to the regulations of a security crash test, which includes a collision with approximately 16 km/h partially covered against a rigid wall. The impact limitation devices must absorb a larger portion of the kinetic energy, so that the motor vehicle structure behind them stays undamaged and the motor vehicle is assigned a corresponding damage level type. All the devices mentioned previously are not configured for the new Danner test, used since 2006. The previous absorption systems are made for a test configuration with a barrier weight of 1000 kg with a 0° impact angle. With the 2006 requirements, the weight of the barrier was raised to 1400 kg and the load replaced with 10° to the longitudinal axis, and a high force introduction additionally occurs in a y-direction. With this new 10° loading condition, the front car structures of the motor vehicles are disadvantageously loaded. Through the diagonal components of the force introduced through the collision, plastic deformations occur in the front frame; in the worst case, also on the side of the front frame facing away from the impact.

In view of the foregoing, at least one object of this invention is, therefore, to create an impact absorption system which will be able to handle the new (Danner) loading conditions. In addition, other objects, desirable features, and characteristics will become apparent from the subsequent summary and detailed description and the appended claims, taken in conjunction with the accompanying drawings and this background.

SUMMARY

This at least one object, and other objects, desirable features, and characteristics, is solved through a crash box device according to the preamble of claim 1 and an impact absorption system according to the preamble of claim 9 in connection with the characteristics following these. Advantageous improvements to the invention are presented in the dependent claims herein.

The impact absorption system includes, but is not limited to, the technical instruction that a crash box device, particularly to absorb collision forces for a motor vehicle, must also particularly include collision forces which impact in more than one direction: a deformable element for absorbing a collision force impacting in the main direction through a corresponding deformation and/or absorption movement, an impact-limitation device fastened on one end of the deformable element, a support element connected with the other end of the deformable element, preferably the end opposite the other end for the reception of the deformable element and for attaching further building components and fasteners to attach the deformable element with the impact limitation device and/or the support element, and the fasteners comprise at least one holding area for holding the deformable element and at least one guiding area branching off of this, which, in the event of a collision, allows the movement of the deformable element from the holding area along the guiding area in a additional direction, deviating from the main direction.

The crash box device is essentially made up of three elements: a deformable element which absorbs the impact energy of a collision through deforming, an impact limitation device which limits the deformation of the deformable element and a support element which receives the deformable element and serves to connect to further components of the motor vehicle. The three essential components of the crash box device are connected with each other through corresponding fasteners. The deformable element is preferably configured as a clinch-pipe. The cross-section of the deformable element configured as a clinch-pipe can have any geometrical shape; however, a circular cross-section is preferred.

In order to fasten the deformable element to the other two components, the fasteners provide at least one holding area configured to hold the deformable element. This can be configured on the support element or on the impact limitation device. A guiding device is attached to each holding area. The holding area and the guiding area will preferably overlap, and the guiding area branches off of the holding area. In the case of a collision, the deformable element, which absorbs the impact energy essentially through deformation in the main direction, can also be moved in an additional direction into the guiding area. In this way, a portion of the impact energy is absorbed in a different direction from the main direction. For the movement of deformable element into the guiding area, a deformation or dent in the holding or connecting area is required.

It is further preferred that the guiding area encompasses at least two partial areas which allow the movement of the deformable element into two directions parallel to the additional direction. The two partial areas are preferably configured symmetrically. In this way, the crash box device can be employed on both the left and right side of the motor vehicle.

Additionally, it is preferred that the guiding device is configured as a cavity stretching in the additional direction. The main direction is principally the longitudinal axis of the motor vehicle, i.e. the X axis. The additional direction is set at an angle to the main direction in which a force, particularly a force impacting at an angle, demerges. In this way, the force introduced at angle divides principally into a main direction and an additional direction. As the guiding area is arranged in the additional direction, it can also absorb energy in this direction.

It is also preferred that the guiding area is configured as a cavity tapering towards the additional direction. In this tapering cavity, a plastic re-shaping is achieved through the movement of the deformable element in the additional direction, through which energy is absorbed. The cavity can, if desired, be pointed; conical, for example. Alternatively, the guiding area or the energy absorbed in this direction can be absorbed also through a damping element which is elastically deformable.

It is also preferred that the additional direction in which the guiding area stretches is essentially configured at a right angle to the main direction. This allows an optimal division of force impacting at an angle into an x-component (in the direction of the vehicle axis) and a y-component lateral to the axis.

A preferred embodiment further provides that a deformable element is essentially a longitudinal element stretching in the main direction. In this way, it can be ensured that a main force impacting in the main direction can be absorbed through the longitudinal deformable element which also stretches along the main direction. In particular, a large deformation path in the direction of the stretching is made through the longitudinal stretching so that the greatest part of the force impacting in the main direction can be absorbed.

For this reason it is preferred that the fasteners further encompass at least one fastening area which is configured on at least one final range of the deformable element to work with the corresponding holding area to keep up the connection in a normal case and the connection to the holding area is released in the case of a crash. To this end, the deformable element can be pressed into the holding area in the style of a press fit, and normally a secure hold is guaranteed; a movement in the additional direction is possible in the case of a crash through a deformation of the fastening area. On the other hand, the deformable element can be fastened firmly or positively with or within the holding area, and a dent or something similar is provided so that in the case of a crash, this connection is released and a movement in the additional direction along the guiding areas is guaranteed.

It is further preferred that the deformable element is configured as a clinch-pipe with an axis running along the main direction.

The embodiments of the invention further include the technical instruction that an impact absorption system, in particular for motor vehicles, specifically within the front range of motor vehicle covers: a crash box device in accordance with embodiments of the invention and a motor vehicle structure, which sandwiches the crash box device in a high-impact risk area. The crash box device is arranged on the motor vehicle structure in such a way that it absorbs the collision according to its function and prevents plastic deformations in further motor vehicle parts.

For this reason, it is preferred that the motor vehicle structure comprises a connecting plate on the side of the car body, with which the support element of the crash box device is connected and/or comprises a bumper device which is connected with the impact limitation device. In this way, it is possible to create an effective and reliable impact absorption system.

BRIEF DESCRIPTION OF THE DRAWINGS

The present invention will hereinafter be described in conjunction with the following drawing figures, wherein like numerals denote like elements, and FIG. 1 a schematic, perspective view of a section of an impact absorption system according to an embodiment of the invention, and the connection between the car body and the support element is not yet established.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
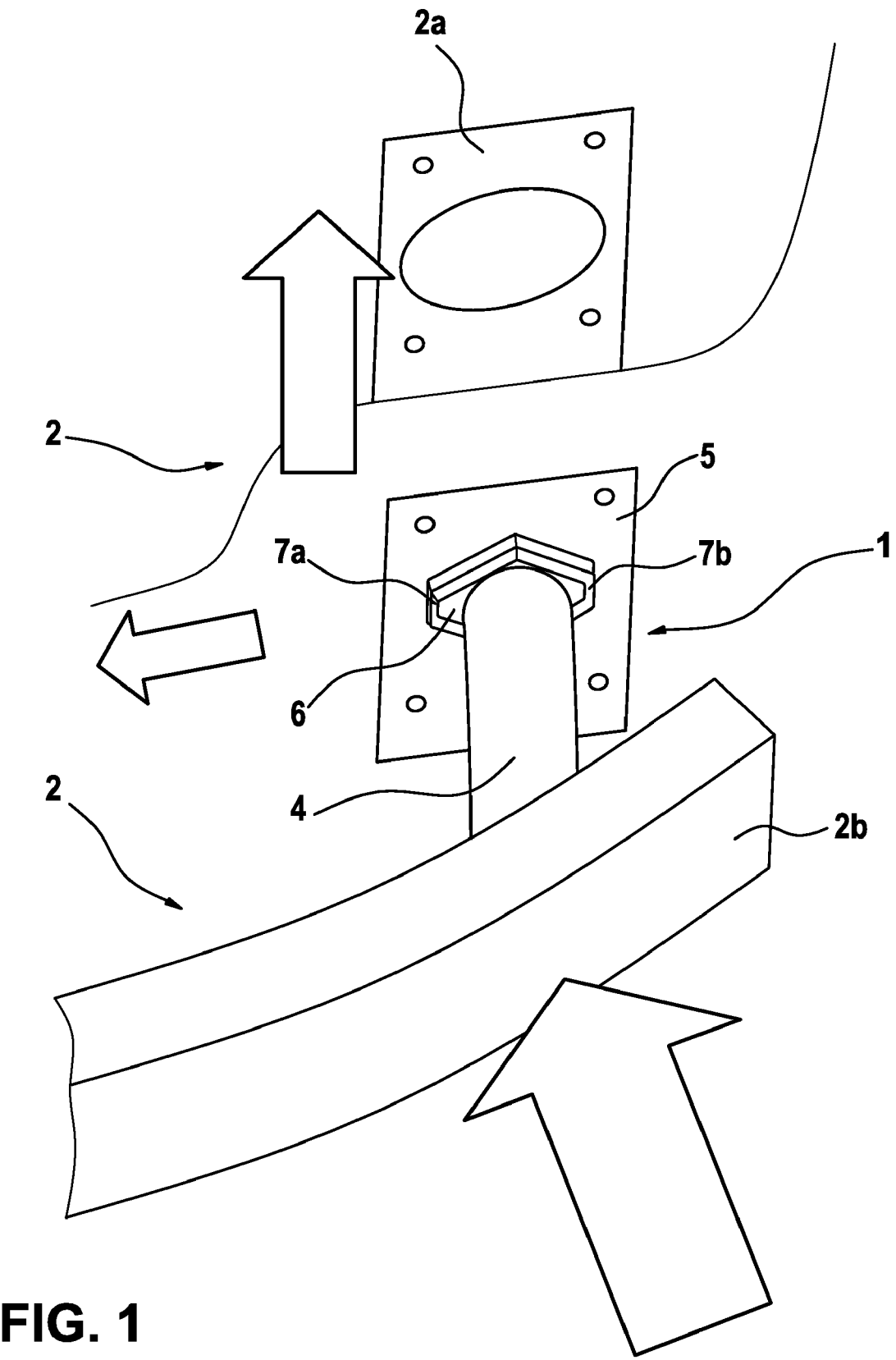

FIG. 1 shows a schematic perspective view of impact absorption system 1. The impact absorption system 1 comprises a motor vehicle structure 2 with a connecting plate 2a and a bumper device 2b. Between the connecting plate 2a and the bumper device 2b, a crash box or crash box device 3 is arranged so these are shown as only connected with the bumper device 2b. The crash box device 3 comprises a deformable element 4 which is constructed as a clinch pipe and a support element 5 formed as a connecting plate. Furthermore, the crash box device 3 comprises an impact limitation device, not shown here, connected with bumper device 2b. The support element 5 of the crash box device 3 can be connected to the connecting plate 2a using fasteners. The support element 5 comprises a holding area 6 central in which the deformable element 4 is in a fixed position in a normal situation/case. Laterally from there extend two guiding areas 7, a first guiding area 7a and a second guiding area 7b. The arrow schematically illustrates the extent of the force occurring upon an impact. The force of the impact acts upon the bumper device 2b. From there, the force is transferred on to the crash box device 3. The main component of the impact acting at an angle is absorbed in two components. The greater component, indicated through the vertical arrow pointing up, is absorbed in the x direction, that is, along the longitudinal axis of the motor vehicle. The smaller component, indicated through the horizontal arrow pointing to the left, is absorber in the y direction, that is, along the transverse axis of the vehicle, in parallel to the plane formed by the vehicle floor. The crash box device 3 is shown in detail in FIG. 2.

Figure 2A:
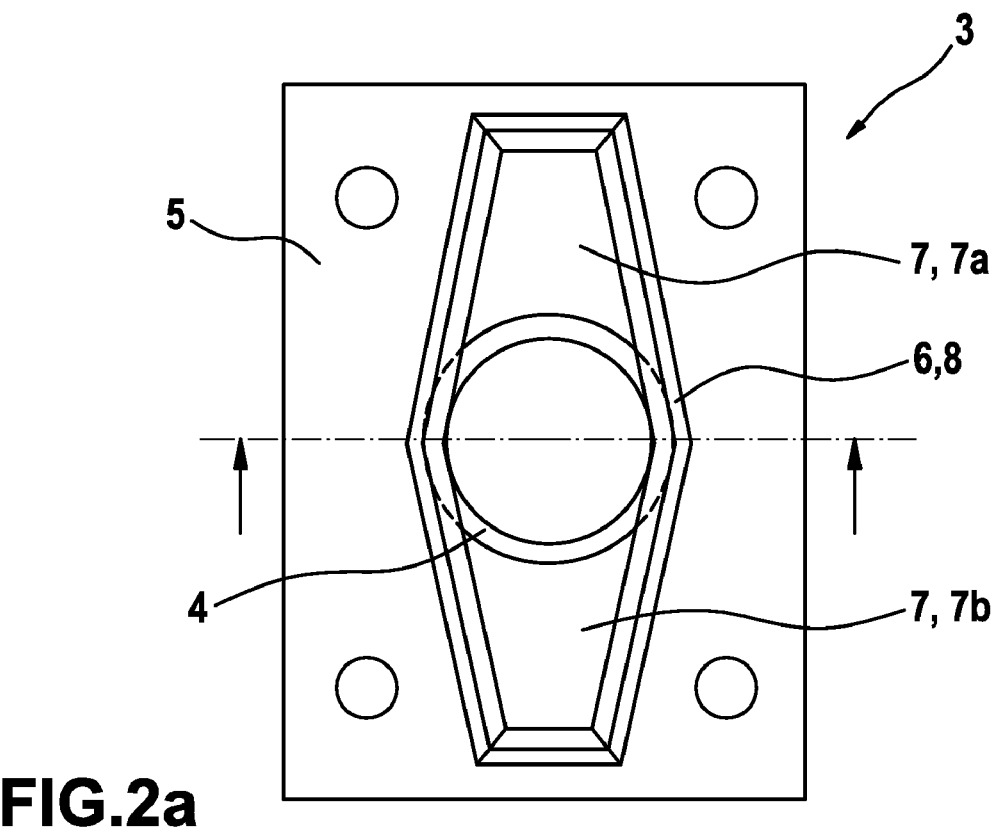
FIG. 2a a schematic rear view of a crash box device.

FIG. 2a shows a schematic rear view of a crash box device 3 as per FIG. 1. In the support element 5 displayed, the holding area 6 is set approximately centrally in the support element 5. Laterally from there extend guiding areas 7, 7a, 7b. Upwards from the middle the first guiding area 7a is located, downwards the second guiding area 7b. The deformable element 4, formed as a clinch pipe, located in holding area 6, is also displayed. At one end of the deformable element 4 the fastening area 8 is set, which acts together with holding area 6 to provide a firm connection. In this case the fastening area 8 is compressed into the holding area 6. However it can also be fixed on to the holding area 6 by means of welding or by other means. A predetermined breaking point is provided in the case of a firmly bonded or positively bonded connection, which would enable, upon impact, the movement of the deformable element along the guiding areas 7.

Figure 2B:
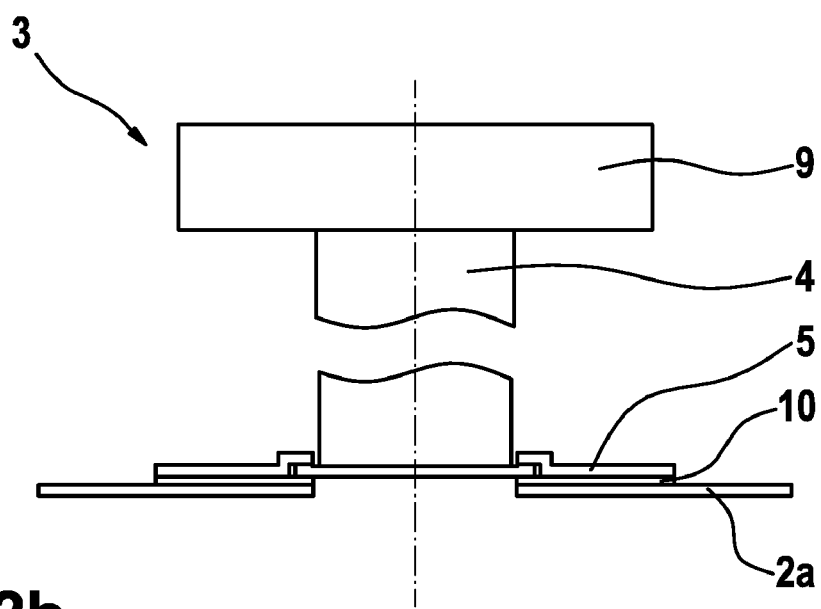
FIG. 2b a side view of the crash box device according to FIG. 2a plus a reinforcement plate as well as a connecting plate for fastening onto the car body.

FIG. 2B shows the crash box device 3 in a lateral view. FIG. 2b shows an impact limitation device 9, positioned downwards, with which the deformable element 4 is connected; further, a support element 5 and a reinforcement plate 10 linked thereto, and a connecting plate 2a on the side of the vehicle body. Upon impact or crash, the deformable element can now be displaced perpendicularly to the drawing level, in order to absorb the force acting in this direction, through deformation as well as displacement perpendicular to the drawing level. In the direction of the schematically displayed axis, which runs through the clinch pipe axially, the deformation of the deformable element takes place, which, as described, is developed here as clinch pipe. The deformation in the direction in the axial direction is, as described, limited by the impact limitation device 9.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A motor vehicle crash box device for a motor vehicle for absorbing collision forces at an angle relative to a longitudinal axis of the motor extending in a first direction, comprising:
   a deformable element adapted to absorb a collision force that essentially impacts in the first direction through a corresponding movement, the deformable element having a first end and a second end;
   a final range impact limiter mechanism coupled to the first end of the deformable element for limiting a deformation of the deformable element upon receiving the collision force;
   a support element coupling the deformable element to a vehicle structure of the motor vehicle, the support element comprising
   a holding area adapted to hold the second end of the deformable element, and
   a guiding area that extends from the holding area, wherein the guiding area allows a movement of the deformable element out of the holding area and along the guiding area in at least a second direction which deviates from the first direction.

2. The motor vehicle crash box device according to claim 1, wherein the guiding area comprises at least two partial areas for movement of the deformable element relative to the holding area in the second direction and a third direction, each substantially parallel to one another.

3. The motor vehicle crash box device according to claim 1, wherein the guiding area is configured as a cavity extending at least in at least the second direction.

4. The motor vehicle crash box device according to claim 1, wherein the guiding area is configured a cavity tapering in at least the second direction.

5. The motor vehicle crash box device according to claim 1, wherein the second direction is generally perpendicular to the first direction.

6. The motor vehicle crash box device according to claim 1, wherein the deformable element is an elongated element extending in the first direction.

7. The motor vehicle crash box device according to claim 1, further comprising at least one fastening area that couples the support element to the vehicle structure.

8. The motor vehicle crash box device according to claim 1, wherein the deformable element is configured as a clinchpipe with an axis running substantially along the first direction.

9. A motor vehicle impact absorption system for a motor vehicle that is adapted for an impact absorption of a collision impacting a longitudinal axis at an angle, comprising:

a crash box device, the crash box device comprising:
a deformable element adapted to absorb a collision force that essentially impacts in a first direction through a corresponding movement, the deformable element having a first end and a second end;
a final range impact limiter mechanism coupled to the first end of the deformable element for limiting a deformation of the deformable element upon receiving the collision force;
a support element coupling the deformable element to a vehicle structure of the motor vehicle, the support element comprises
a holding area adapted to hold the second end of the deformable element and a guiding area that extends from the holding area, wherein the guiding area allows the movement of the deformable element out of the holding area and along the guiding area in second and third directions generally perpendicular to the first direction; and
a motor vehicle structure that sandwiches the crash box device in an impact-prone impact area.

10. The motor vehicle impact absorption system according to claim 9, wherein the motor vehicle structure comprises a connecting plate connected to the carrier element of the crash box device; and a bumper device connected to the impact limitation device.

* * * * *